United States Patent
Martin et al.

(10) Patent No.: US 9,027,326 B2
(45) Date of Patent: May 12, 2015

(54) VEHICLE EXHAUST HEAT RECOVERY SYSTEM

(75) Inventors: Douglas Raymond Martin, Canton, MI (US); Kenneth J. Jackson, Dearborn, MI (US); Nimrod Kapas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 13/086,386

(22) Filed: Apr. 13, 2011

(65) Prior Publication Data
US 2012/0260640 A1 Oct. 18, 2012

(51) Int. Cl.
F01N 3/02 (2006.01)
F01N 5/02 (2006.01)
F28F 27/02 (2006.01)
F28D 21/00 (2006.01)

(52) U.S. Cl.
CPC . F01N 5/02 (2013.01); *Y02T 10/16* (2013.01); *F01N 2240/02* (2013.01); *F01N 2240/36* (2013.01); *F01N 2410/02* (2013.01); F28F 27/02 (2013.01); F28D 21/0003 (2013.01); *F28F 2250/06* (2013.01)

(58) Field of Classification Search
USPC .................................... 60/287, 288, 320, 324
See application file for complete search history.

(56) References Cited

U.S. PATENT DOCUMENTS

| 6,370,871 | B2 | 4/2002 | Suzuki et al. |
| 7,628,144 | B2 | 12/2009 | Vetrovec |
| 2006/0107933 | A1* | 5/2006 | Dilley et al. ............. 123/568.12 |
| 2008/0053060 | A1* | 3/2008 | Olver ............................ 60/226.1 |
| 2009/0226301 | A1* | 9/2009 | Priestman et al. ............. 415/145 |
| 2009/0235662 | A1 | 9/2009 | Knafl et al. |
| 2011/0099989 | A1* | 5/2011 | Prior et al. ....................... 60/320 |
| 2012/0160450 | A1* | 6/2012 | Gerges et al. .................... 165/96 |

FOREIGN PATENT DOCUMENTS

GB 826054 A * 12/1959 ................ F01N 1/02

OTHER PUBLICATIONS

Lampton, Christopher, How Exhaust Heat Recovery and Recirculation Works, http://auto.howstuffworks.com/fuel-efficiency/hybrid-technology/exhaust-heat-recovery-recirculation.htm, excerpts from Apr. 2011.
Matsubara et al., Development of New Hybrid System for Compact Class Vehicles, Doc No. 09PFL-1101, SAE International 2008.
V. Tesar: "Fluidic Valves for Variable-Configuration Gas Treatment," Department of Chemical and Process Engineering, The University of Sheffield, UK; Trans IChemE, Part A. Sep. 2005, Chemical Engineering Research and Design, 83(A9); pp. 1111-1121.

* cited by examiner

*Primary Examiner* — Kenneth Bomberg
*Assistant Examiner* — Jonathan Matthias
(74) *Attorney, Agent, or Firm* — Carlson, Gaskey & Olds

(57) ABSTRACT

The present disclosure relates to a vehicle exhaust heat recovery system including a first exhaust line fluidically connected to a heat exchanger, a second exhaust line fluidically connected to the first exhaust line, and an inanimate flow regulator in the first exhaust line configured to limit exhaust flow under predetermined conditions.

20 Claims, 3 Drawing Sheets though flow through the heat-exchanging line is limited, more exhaust flows through the bypass exhaust line. No electromechanical controls or thermally actuable chemicals are required to activate the flow regulator. The geometry of the flow regulator enables the conditional flow limiting functionality of the system. The flow regulators include no moving parts and in this way are
VEHICLE EXHAUST HEAT RECOVERY SYSTEM

TECHNICAL FIELD

The present disclosure relates to vehicle exhaust heat recovery systems and flow regulators for the same.

BACKGROUND

Many conventional vehicles with internal combustion engines have some sort of heat recovery system. Heat recovery systems are used to recycle the thermal energy dissipated by the engine. Existing exhaust heat recovery systems can use a bypass valve between a bypass exhaust line and heat-exchanging exhaust line to control the flow of exhaust over the heat exchanger. This bypass valve must be actuated, either passively using a thermally active material or actively using either a vacuum or electric motor. One exemplary bypass valve is disclosed as an "exhaust gas flow diverging device" in U.S. Pat. No. 6,370,871 titled "Internal Combustion Engine Having Lean NOx Catalyst" to Suzuki et al. This device is, however, more complex than an inanimate flow regulator because it relies on electromechanical controls and is more prone to failure as it contains animate parts configured to perform within predetermined parameters.

It is taught in U.S. Pat. No. 7,628,144 titled "Supercharged internal combustion engine system" to Vetrovec to use a variable area nozzle to regulate nozzle mass flow rate in a supercharger application. This, however, is not disclosed and taught with respect to a vehicle exhaust heat recovery system with bypass.

Therefore, it is desirable to have a less complex and more reliable flow regulator for a vehicle exhaust heat recovery system with bypass.

SUMMARY

The present teachings can address one or more of the above-mentioned issues. Other features and/or advantages may become apparent from the description which follows.

Certain embodiments of the present invention relate to a vehicle exhaust heat recovery system, including: a first exhaust line having a heat exchanger therein; a second exhaust line fluidically connected to the first exhaust line; and an inanimate flow regulator in the first exhaust line and upstream of the heat exchanger, configured to limit exhaust flow under predetermined conditions.

Another exemplary embodiment of the present invention relates to a vehicle exhaust heat recovery system, including: a heat exchanger; a first exhaust line in which the heat exchanger is located; a second exhaust line fluidically connected to the first exhaust line; and a flow regulator in the first exhaust line and upstream of the heat exchanger, configured to inanimately limit exhaust flow therethrough when an exhaust flow rate exceeds a predetermined threshold.

Yet another exemplary embodiment of the present invention relates to a method of manufacturing a vehicle exhaust heat recovery system, including: incorporating a heat exchanger into a first exhaust line; fluidically connecting a second exhaust line to the first exhaust line; and incorporating an inanimate flow regulator in the first exhaust line, upstream of the heat exchanger. The inanimate flow regulator is configured to limit exhaust flow under predetermined conditions.

Another exemplary embodiment of the present invention relates to an inanimate flow regulator for a vehicle exhaust heat recovery system, configured to limit exhaust flow under predetermined conditions. The inanimate flow regulator is an airfoil formed in the heat recovery system.

One advantage of the present teachings is that they disclose vehicle exhaust heat recovery systems with bypasses and flow regulators that require no electromechanical controls to operate. The systems are thereby much less complex and costly than contemporary designs. Moreover, failure modes are significantly reduced as the systems include no moving parts. Still, the present teachings are compatible with systems having actuable bypass valves as well.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

Figure 1:
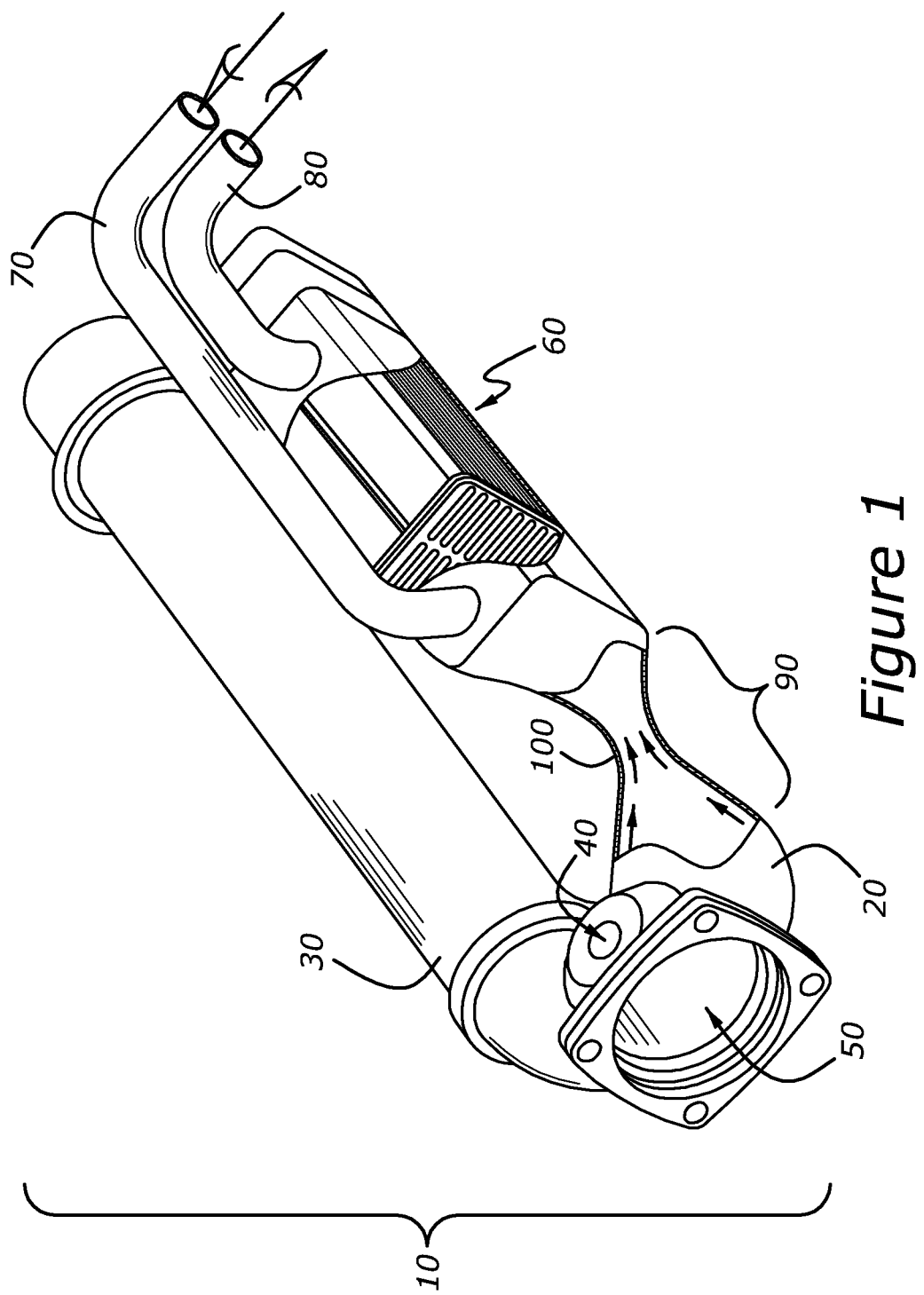
FIG. 1 is a perspective view of an exemplary vehicle exhaust heat recovery system with heat exchanger.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, wherein like characters represent the same or corresponding parts throughout the several views there are shown exemplary vehicle exhausts with heat recovery systems included therein. Said heat recovery systems are configured to selectively recycle the thermal energy from the exhaust through a heat exchanger. In the illustrated embodiments, the heat recovery systems include at least two exhaust lines: (i) a heat-exchanging exhaust line; and (ii) a bypass exhaust line. In one embodiment, the heat-exchanging exhaust line includes an inanimate flow regulator configured to limit exhaust flow to the heat exchanger when an exhaust flow rate exceeds a predetermined threshold. When the exhaust flow rate exceeds the predetermined threshold it is desirable, in certain circumstances, to bypass the heat exchanger and guide fluid through the bypass exhaust line. One application guides fluid through the bypass line to control overheating of coolant. When flow through the heat-exchanging line is limited, more exhaust flows through the bypass exhaust line. No electromechanical controls or thermally actuable chemicals are required to activate the flow regulator. The geometry of the flow regulator enables the conditional flow limiting functionality of the system. The flow regulators include no moving parts and in this way are "inanimate." Two disclosed examples of an inanimate flow regulator include, but are not limited to, a venture (or converging wall) and a two dimensional airfoil formed with respect to the heat-exchanging exhaust line.

The exemplary exhaust heat recovery systems can have the benefit of increasing fuel efficiency and/or reducing vehicle emissions. In one embodiment, exhaust heat from the heat recovery system is used to warm engine coolant and keep the engine running warm, particularly when the motor has been off for longer periods of time. In another embodiment, the HVAC (or heating ventilating and air conditioning system) recycles the exhaust heat to the vehicle cabin. In another embodiment, the nitrous oxide (NOx) emissions are reduced because the heat exchanger is a thermoelectric heat exchanger configured to generate electricity from the exhaust heat. Any type of heat exchanger is compatible with the exemplary exhaust heat recovery systems discussed herein. In some embodiments, the heat exchanger has a 3 kW capacity. The disclosed heat exhaust recovery systems are compatible with any type of car, truck or SUV with an internal combustion engine, including hybrid vehicles.

Figure 2:
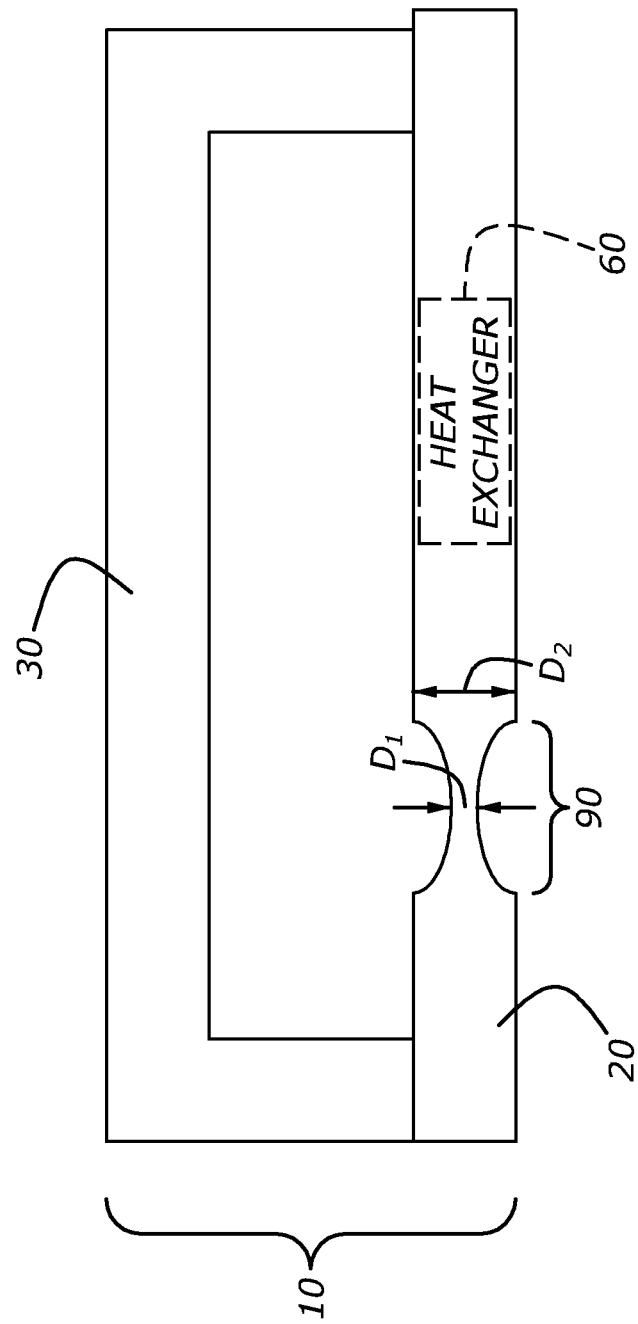
FIG. 2 is a side view of the vehicle exhaust heat recovery system of FIG. 1.

Referring now to FIGS. 1 and 2, there is shown therein one exemplary embodiment of a vehicle heat recovery system 10. The system 10 is included in a vehicle exhaust system (not shown). FIG. 1 illustrates a perspective view of the heat recovery system 10. As shown the system 10 includes two exhaust lines 20 and 30 arranged in parallel. The lines 20, 30 are fluidically connected at junction 40. In one embodiment, a flat baffle plate is formed at the downstream end of junction 40. In the illustrated embodiment, an inlet 50 that receives exhaust is formed at junction 40. The inlet 50 is fluidically connected to an engine exhaust manifold (not shown). Exhaust line 20 includes an exemplary heat exchanger 60. There is a partial cut-away in line 20 to shown the heat exchanger 60. In this embodiment, heat exchanger 60 uses circulating coolant to transfer thermal energy from the exhaust. A coolant inlet 70 is included upstream of the heat exchanger 60. A coolant outlet 80 is included downstream of the heat exchanger 60. In another embodiment, the flow of the coolant is reversed, 70 is the outlet and 60 is the coolant inlet. Coolant flow orientation can be used to tune heat recovery.

Upstream of the heat exchanger 60 is an exemplary inanimate flow regulator 90, as shown in FIGS. 1 and 2. The flow regulator 90 in this embodiment is a converging wall formed in line 20. The converging wall is a choked flow nozzle that limits the mass flow through the heat exchanger 60. The cross-section of line 20 varies or converges at 100. The converging wall defines a minimum diameter, D1, and maximum diameter, D2; the maximum diameter, in this embodiment, is equal to the diameter of exhaust line 20. The geometry of the regulator 90 automatically and inanimately limits exhaust flow through line 20 when the exhaust mass flow rate exceeds a predetermined threshold. In this embodiment, the ratio of the minimum diameter of the converging wall (D1) to a maximum diameter of the converging wall or exhaust line (D2) is equal to 0.05. With this geometry the flow regulator 90 is configured to substantially limit exhaust flow through line 20 when an exhaust flow rate is greater than or equal to 10 lbm/min.

Flow is substantially averted to a bypass exhaust line 30, as shown in FIGS. 1 and 2, when the exhaust flow rate exceeds the predetermined threshold. Bypass line 30 is configured to accept more exhaust when flow is limited in exhaust line 20 by the flow regulator 90 than when exhaust is not limited in exhaust line 20. Bypass line 30 can be used to prevent overheating of coolant. In the illustrated embodiment of FIG. 1, bypass line 30 has a uniform diameter or cross-section. Lines 20 and 30 are fluidically connected to a manifold or exhaust outlet.

Exhaust lines 20 and 30 are composed of an aluminum alloy but can be formed from comparable materials. In this embodiment, the flow regulator 90 is formed in a molding process with exhaust line 20. In other embodiments, flow regulator 90 can be formed (for example) via an extrusion process, crimping, stamping, or piece-meal welding.

Other exemplary embodiments incorporate converging walls of different geometries as a flow regulator. In one embodiment, the ratio of the minimum diameter of the converging wall to a maximum diameter of the exhaust line is equal to 0.1. In another embodiment, the ratio of the minimum diameter of the converging wall to a maximum diameter of the exhaust line is equal to 0.3.

Figure 3:
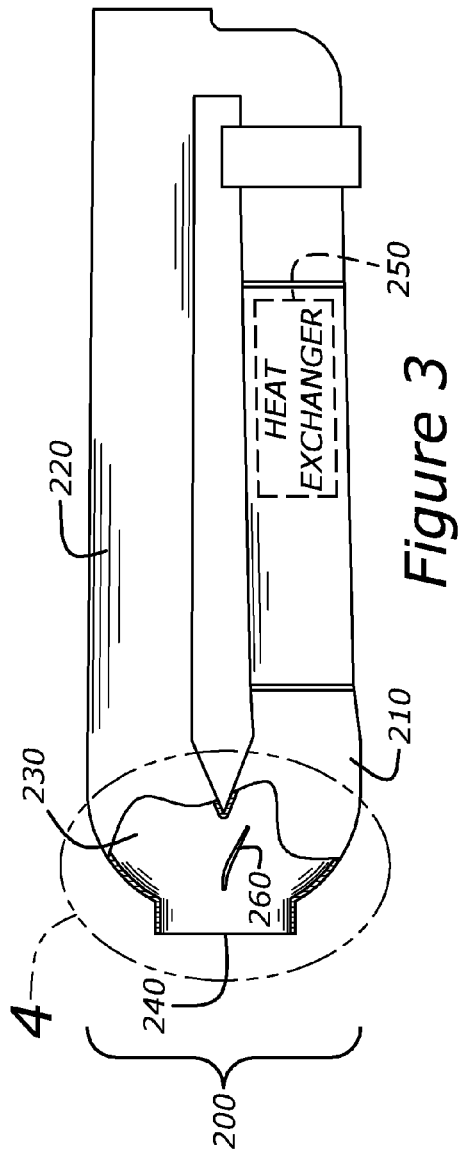
FIG. 3 is a side view of another exemplary vehicle exhaust heat recovery system.
Figure 4:
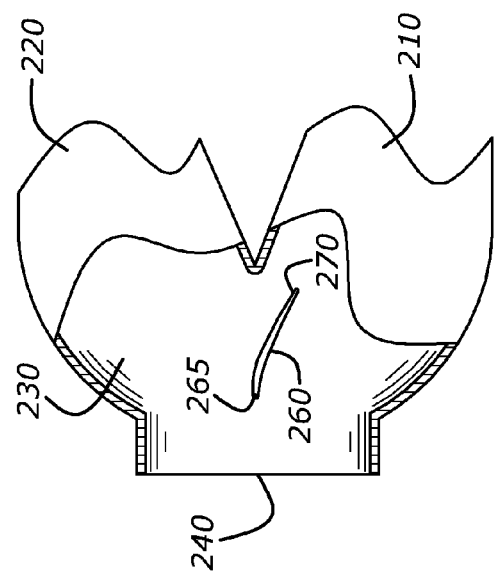
FIG. 4 is a partial side view of the vehicle exhaust heat recovery system of FIG. 3.

Referring now to FIGS. 3 and 4, there is shown therein another exemplary embodiment of a vehicle heat recovery system 200. The system 200 is included in a vehicle exhaust system (not shown). FIG. 3 illustrates a side view of the heat recovery system 200. As shown the system includes two exhaust lines 210 and 220 arranged in parallel. The lines 210, 220 are fluidically connected at junction 230 having an inlet 240 formed therein that receives exhaust. The inlet 240 is fluidically connected to an engine exhaust manifold. Exhaust line 210 is configured to include any type of heat exchanger 250.

Upstream of the heat exchanger 250 is an exemplary inanimate flow regulator 260, as shown in FIGS. 3 and 4. The flow regulator 260 in this embodiment is an airfoil extending across the diameter of junction 230. The airfoil is a cambered airfoil with a leading edge 265 directed at or against the flow of exhaust (as shown in FIG. 4). The trailing edge 270 of airfoil is positioned downward at an angle of approximately 20 degrees clockwise from a right side view. In this configuration, airfoil limits the mass flow through the heat-exchanging line when the exhaust mass flow rate exceeds a predetermined threshold. The geometry of the regulator 260 automatically and inanimately limits exhaust flow through line 210 when the exhaust mass flow rate exceeds a predetermined threshold. With this geometry the flow regulator 260 can be configured to substantially limit exhaust flow through line 210 when an exhaust flow rate is greater than or equal to 5 lbm/min.

In this embodiment as well, flow is substantially averted to a bypass exhaust line 220, as shown in FIGS. 3 and 4, when the exhaust flow rate exceeds the predetermined threshold. In the illustrated embodiment of FIG. 3, bypass line 220 has a uniform diameter or cross-section. Bypass line 220 is configured to accept more exhaust when flow is limited in exhaust line 210 by the airfoil than when exhaust is not limited in exhaust line 210. Lines 210 and 220 are fluidically connected to a manifold or exhaust outlet.

In other embodiments, the angular position the airfoil 260 can be greater or less than 20 degrees. In one embodiment, the chord of the airfoil is position at a 15 degree angle with respect to junction 230. In other embodiments, airfoil is positioned at different vertical and horizontal positions than shown in FIG. 4. For example, the leading edge 265 of airfoil is positioned at the center of junction 230 as shown in FIG. 4. The airfoil can be positioned at a higher or lower vertical position, or fore or aft horizontal position with respect to junction 230. Airfoil 260 can also be larger or smaller in proportion to exhaust lines than shown. In one embodiment, airfoil is not cambered and the upper and lower cambers are symmetrical. In another embodiment, a plurality of airfoils is incorporated into the heat recovery system at different locations.

In the embodiment shown in FIGS. 3 and 4, exhaust lines 210 and 220 are composed of steel but can be formed from comparable materials. In this embodiment, the airfoil 260 is also composed of steel and is welded to the inner walls of the system at junction. In other embodiments, airfoil can be composed of other materials and can be formed (for example) via a stamping or molding process.

Also disclosed herein is a method of manufacturing a vehicle exhaust heat recovery system. The method includes the steps of: fluidically connecting a first exhaust line to a heat exchanger (e.g., as shown with respect to FIGS. 1-2); fluidically connecting a second exhaust line to the first exhaust line (e.g., as shown with respect to FIGS. 1-4); and incorporating an inanimate flow regulator in the first exhaust line (e.g., as shown with respect to FIGS. 1-4). The inanimate flow regulator is configured to limit exhaust flow under predetermined conditions. As shown in FIGS. 1-4, the inanimate flow regulator can be, for example, a converging wall formed in an exhaust line or an air foil connected to at least one wall of an exhaust line. The predetermined condition for limiting flow can be an exhaust flow rate greater than or equal to a target flow rate (e.g., 10 lbm/min, 15 lbm/min or 5 lbm/min). Any target flow rate can be set as a condition for limiting exhaust flow.

While the illustrated embodiments show a single heat-exchanging exhaust line and a single bypass exhaust line greater than two exhaust lines can be utilized. For example, in one embodiment, two bypass lines are included in the vehicle exhaust heat recovery system.

The term "fluidically connected" can be interpreted to mean that one or more items are configured to be in selective or continuous fluid communication. For example, it is taught herein that a heat exchanger is fluidically connected to an exhaust line when the heat exchanger is incorporated in the exhaust line. In said example, the heat exchanger is continuously in fluid communication with the first exhaust line. In another example, two exhaust lines are fluidically connected but are also separated by a flow regulator which, under predetermined conditions, significantly limits fluid communication between the two exhaust lines. In either example said items are fluidically connected.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

Those familiar with the art to which this invention relates will recognize various alternative designs and embodiments for practicing the invention within the scope of the appended claims. In particular, the type and location of any device can vary from these examples. Also, the sequence of steps in the methods can be altered; some steps can be omitted or added, etc.

We claim:

1. A vehicle exhaust heat recovery system, comprising:
   an internal combustion engine;
   an exhaust line communicating exhaust flow from the internal combustion engine; and
   an inanimate flow regulator configured to limit exhaust flow under predetermined conditions; wherein the inanimate flow regulator is an airfoil formed in the vehicle exhaust heat recovery system.

2. The system of claim 1, wherein the predetermined condition is an exhaust flow rate greater than or equal to 10 lbm/min.

3. The system of claim 1, wherein the airfoil is angled with respect to the vehicle exhaust heat recovery system.

4. The system of claim 1, wherein the airfoil is formed in the exhaust line.

5. A vehicle exhaust heat recovery system, comprising:
   an internal combustion engine;
   a first exhaust line that communicates exhaust flow from the internal combustion engine, the first exhaust line having a heat exchanger therein;
   a second exhaust line fluidically connected to and arranged to receive exhaust flow in parallel with the first exhaust line; and
   an inanimate flow regulator in the first exhaust line and upstream of the heat exchanger, configured to limit exhaust flow under predetermined conditions.

6. The system of claim 5, wherein the inanimate flow regulator is a converging wall formed in the first exhaust line.

7. The system of claim 6, wherein a ratio of a minimum diameter of the converging wall to a maximum diameter of the first exhaust line is less than or equal to 0.10.

8. The system of claim 7, wherein the ratio of the minimum diameter of the converging wall to a maximum diameter of the first exhaust line is less than or equal to 0.05.

9. The system of claim 5, wherein the inanimate flow regulator is an airfoil formed in the system.

10. The system of claim 5, wherein the predetermined condition is an exhaust flow rate greater than or equal to 10 lbm/min.

11. The system of claim 5, wherein the first exhaust line and the second exhaust line are fluidly connected at a junction, and an inlet of the junction is fluidly connected to an exhaust manifold of the internal combustion engine.

12. The system of claim 5, wherein the first exhaust line and the second exhaust line are fluidly connected at a junction, and the inanimate flow regulator is an airfoil that extends across a diameter of the junction.

13. The system of claim 5, wherein the second exhaust line is a bypass exhaust line having a uniform cross-section and the first exhaust line has a non-uniform cross-section.

14. A vehicle exhaust heat recovery system, comprising:
   an internal combustion engine;
   a heat exchanger;
   a first exhaust line in which the heat exchanger is located, the first exhaust line communicating exhaust flow from the internal combustion engine;
   a bypass exhaust line fluidically connected to the first exhaust line; and
   a flow regulator in the first exhaust line and upstream of the heat exchanger configured to inanimately divert exhaust flow into the bypass exhaust line when an exhaust flow rate exceeds a predetermined threshold.

15. The system of claim 14, wherein the bypass exhaust line is configured to accept more exhaust when flow is limited in the first exhaust line by the flow regulator than when exhaust is not limited in the first exhaust line.

16. The system of claim 14, wherein the flow regulator includes:
   a converging wall formed in the first exhaust line.

17. The system of claim 16, wherein a ratio of a minimum diameter of the converging wall to a maximum diameter of the first exhaust line is less than or equal to 0.10.

18. The system of claim 17, wherein the ratio of the minimum diameter of the converging wall to a maximum diameter of the first exhaust line is less than or equal to 0.05.

19. The system of claim 14, wherein the flow regulator is an airfoil configured to control exhaust flow when an exhaust flow rate exceeds a predetermined threshold.

20. A method associated with a vehicle exhaust heat recovery system, comprising:
   incorporating a heat exchanger into a first exhaust line, the first exhaust line communicating exhaust flow from an internal combustion engine;
   fluidically connecting a second exhaust line to the first exhaust line;
   incorporating an inanimate flow regulator in the first exhaust line, upstream of the heat exchanger; and
   diverting exhaust flow into the second exhaust line with the inanimate flow regulator under predetermined conditions.

* * * * *